United States Patent
Kim et al.

(10) Patent No.: US 11,537,324 B2
(45) Date of Patent: *Dec. 27, 2022

(54) MEMORY SYSTEMS AND METHODS THAT ALLOCATE MEMORY BANKS USING STRIPING SIZE AND STREAM IDENTIFICATION INFORMATION CONTAINED WITHIN DIRECTIVE COMMANDS

(71) Applicant: Samsung Electronics Co., Ltd., Suwon-si (KR)

(72) Inventors: Jinwoo Kim, Seoul (KR); Wan-Soo Choi, Hwaseong-si (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/167,772

(22) Filed: Feb. 4, 2021

(65) Prior Publication Data

US 2021/0157528 A1    May 27, 2021

Related U.S. Application Data

(63) Continuation of application No. 16/413,755, filed on May 16, 2019, now Pat. No. 10,942,679.

(30) Foreign Application Priority Data

Nov. 8, 2018    (KR) .................. 10-2018-0136538

(51) Int. Cl.
   *G06F 3/06* (2006.01)
(52) U.S. Cl.
   CPC .......... *G06F 3/0659* (2013.01); *G06F 3/0604* (2013.01); *G06F 3/0631* (2013.01); *G06F 3/0644* (2013.01); *G06F 3/0656* (2013.01); *G06F 3/0679* (2013.01)

(58) Field of Classification Search
   CPC .... G06F 3/0659; G06F 3/0604; G06F 3/0631; G06F 3/0644; G06F 3/0656; G06F 3/0679; G06F 2212/1016; G06F 2212/1056; G06F 12/0238; G06F 2212/7201; G06F 2212/7203; G06F 2212/7208; G06F 3/061; G06F 12/0623; G06F 12/0646; G06F 12/0875; G06F 12/06
   USPC ..................... 711/114, 4, 154, 170
   See application file for complete search history.

(56) References Cited

U.S. PATENT DOCUMENTS

| | | |
|---|---|---|
| 8,244,966 B2 | 8/2012 | Huang |
| 9,081,668 B2 | 7/2015 | Au et al. |
| 9,542,284 B2 | 1/2017 | Fields et al. |
| 9,880,780 B2 | 1/2018 | Martineau et al. |
| 9,898,202 B2 | 2/2018 | Martineau et al. |

(Continued)

FOREIGN PATENT DOCUMENTS

KR    101734160 B1    5/2017

*Primary Examiner* — Than Nguyen
(74) *Attorney, Agent, or Firm* — Myers Bigel, P.A.

(57) ABSTRACT

A method of operating a multi-bank storage device includes transmitting a write command including stream identification information to the multi-bank storage device, and allocating at least one bank, in which data associated with the write command is to be stored, from among a plurality of banks in the multi-bank storage device, based on striping size information included within the stream identification information. Upon allocation, the data is written into the allocated at least one bank.

13 Claims, 11 Drawing Sheets

(56) References Cited

U.S. PATENT DOCUMENTS

| | | |
|---|---|---|
| 10,942,679 B2* | 3/2021 | Kim .................. G06F 3/0679 |
| 2004/0015655 A1 | 1/2004 | Willis et al. |
| 2007/0180214 A1 | 8/2007 | Radhakrishnan et al. |
| 2010/0262773 A1 | 10/2010 | Borchers et al. |
| 2012/0151138 A1* | 6/2012 | Tokuda ................ G06F 3/0689 |
| | | 711/170 |
| 2012/0170580 A1 | 7/2012 | Jagannathan et al. |
| 2012/0320679 A1* | 12/2012 | Sprouse ............. G06F 12/0246 |
| | | 365/185.12 |
| 2013/0031300 A1 | 1/2013 | Seo et al. |
| 2014/0317346 A1 | 10/2014 | Moon et al. |
| 2016/0048342 A1 | 2/2016 | Jia et al. |
| 2017/0371585 A1 | 12/2017 | Lazo et al. |
| 2018/0039448 A1 | 2/2018 | Harasawa et al. |

\* cited by examiner

MEMORY SYSTEMS AND METHODS THAT ALLOCATE MEMORY BANKS USING STRIPING SIZE AND STREAM IDENTIFICATION INFORMATION CONTAINED WITHIN DIRECTIVE COMMANDS

REFERENCE TO PRIORITY APPLICATION

This application is a continuation of and claims priority to U.S. patent application Ser. No. 16/413,755, filed May 16, 2019, which claims priority under 35 U.S.C. § 119 to Korean Patent Application No. 10-2018-0136538, filed Nov. 8, 2018, the disclosures of which are hereby incorporated herein by reference.

BACKGROUND

Embodiments of the inventive concept described herein relate to integrated circuit memory devices and, more particularly, to multi-bank memory devices, methods of operating multi-bank memory devices and methods of controlling multi-bank memory devices using a host device.

Semiconductor memories are typically classified into a volatile memory device in which stored data will disappear when power is turned off and a nonvolatile memory device in which stored data are retained even when power is turned off.

In general, nonvolatile memory devices may be used to store large amounts of data. However, due to typical limitations in operating speed of a nonvolatile memory device, an excessive delay time may occur upon storing a large amount of data. A plurality of nonvolatile memory devices may be used to reduce the overall delay time required to store large amounts of data. A memory controller which controls the nonvolatile memory device may perform striping by using a plurality of nonvolatile memory devices. The striping relates to a technology for distributing and storing data into nonvolatile memory devices. The number of nonvolatile memory devices in which data are stored may vary with variations in striping size.

In the case where a memory controller has a fixed striping size, the same striping policy may be applied to all data regardless of a characteristic (e.g., a stream ID) of data. In this case, since the striping is "fixed" and is thereby performed without consideration of a required performance of a host, the host typically cannot obtain optimum performance.

SUMMARY

Embodiments of the inventive concept provide a method of operating a storage device, which may apply a striping policy for each data stream in consideration of a required performance of a host and an operating method of a host controlling the storage device.

Also, embodiments of the inventive concept provide an interface protocol between a host and a storage device such that the host may select a striping size.

According to an exemplary embodiment, an operating method of a storage device, which includes a plurality of memory banks, includes receiving a write command including stream identification information from a host, allocating a bank, in which data are to be stored, from among the plurality of banks. This allocating is based on a striping size corresponding to the stream identification information, and is performed in response to the write command. Upon the allocating, the data is written into the allocated bank(s).

According to another exemplary embodiment, an operating method of a host that controls a multi-bank storage device includes selecting a striping size for each of a plurality of data streams to be written into the storage device, and providing striping size information about the selected striping size and stream identification information corresponding to the selected striping size to the storage device. A memory bank, in which data are to be stored, is allocated based on the striping size information and the stream identification information.

According to another exemplary embodiment, a storage device includes a memory device including a plurality of memory banks, and a memory controller. In response to a write command including stream identification information from a host, the memory controller allocates a memory bank, in which data are to be stored, from among the plurality of memory banks based on a striping size corresponding to the stream identification information.

According to a further exemplary embodiment, a method of operating a multi-bank storage device includes transmitting a write command, which includes stream identification information, to the multi-bank storage device. In response to this write command, an operation is performed to allocate at least one bank, in which data associated with the write command is to be stored, from among a plurality of banks in the multi-bank storage device. This allocation is based on striping size information included within the stream identification information. The "write" data is then written into the allocated at least one bank. In addition, the transmitting of the write command may be preceded by transmitting a first directive command including the stream identification information and the striping size information to the multi-bank storage device, and then mapping the striping size information to the stream identification information in the multi-bank storage device, in response to the first directive command. Furthermore, the transmitting of the write command may be followed by transmitting a second directive command including the stream identification information to the multi-bank storage device, and then unmapping the striping size information previously mapped to the stream identification information in response to the second directive command.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Below, embodiments of the inventive concept may be described in detail and clearly to such an extent that an ordinary one in the art easily implements the inventive concept.

Figure 1:
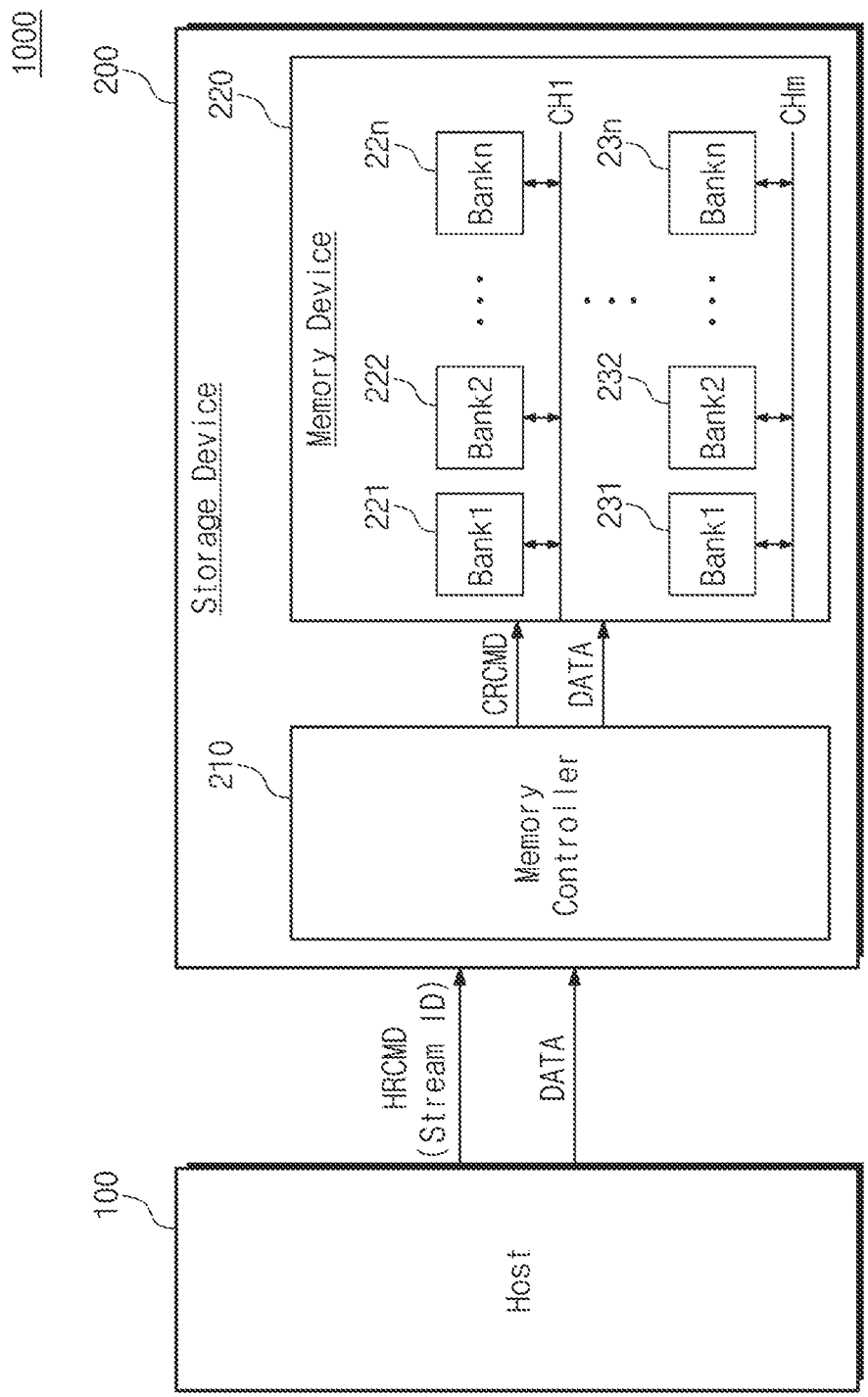
FIG. 1 is a block diagram of an electronic system according to an embodiment of the inventive concept.

FIG. 1 illustrates a block diagram of an electronic system 1000 according to an embodiment of the inventive concept. Referring to FIG. 1, the electronic system 1000 includes a host 100 and a storage device 200. The host 100 may control an operation of the storage device 200. To control an operation of the storage device 200, the host 100 may provide a command to the storage device 200. The storage device 200 may perform an operation in response to the command. For example, the storage device 200 may store data provided from the host 100 or may provide the stored data to the host 100.

The storage device 200 may include a memory controller 210 and a memory device 220. The memory controller 210 may control an operation of the memory device 220. The memory controller 210 may control an operation of the memory device 220 in response to a command received from the host 100. To control an operation of the memory device 220, the memory controller 210 may provide a command to the memory device 220. For example, the memory controller 210 may control the memory device 220 such that data provided from the host 100 are written into the memory device 220. Alternatively, the memory controller 210 may control the memory device 220 such that data stored in the memory device 220 are output from the memory device 220.

The memory device 220 may operate under control of the memory controller 210. For example, in response to a command from the memory controller 210, the memory device 220 may write data or may output data. For example, the memory device 220 may include a flash memory device. However, the inventive concept is not limited thereto. For example, the memory device 220 may include at least one of a volatile memory device such as a static random access memory (SRAM), a dynamic RAM (DRAM), or a synchronous DRAM (SDRAM), and a nonvolatile memory device such as a read only memory (ROM), a programmable ROM (PROM), an electrically programmable ROM (EPROM), an electrically erasable and programmable ROM (EEPROM), a phase-change RAM (PRAM), a magnetic RAM (MRAM), a resistive RAM (RRAM), or a ferroelectric RAM (FRAM).

The memory device 220 may include a plurality of banks 221 to 23$n$ (n being an integer greater than "0"). Each of the banks 221 to 23$n$ may be connected to a relevant channel. For example, a first bank 221 to an n-th bank 22$n$ may be connected to a first channel CH1, and a first bank 231 to an n-th bank 23$n$ may be connected to an m-th channel CHm (m being an integer greater than "0"). Each of the banks 221 to 23$n$ may receive a command and data from the memory controller 210 through a connected channel. For example, each of the banks 221 to 23$n$ may be implemented with a separate die, but the inventive concept is not limited thereto.

The memory controller 210 may access the respective banks 221 to 23$n$ in parallel. For example, the memory controller 210 may respectively write data into the first bank 221 and the second bank 222 in parallel. Alternatively, the memory controller 210 may respectively output data from the first bank 221 and the second bank 222 in parallel. The memory controller 210 may access the banks 221 to 23$n$ through channels connected to the respective banks 221 to 23$n$.

In an embodiment, the host 100 may execute various applications. The host 100 may store data, which are generated according to execution of an application, in the storage device 200. As illustrated in FIG. 1, to store data "DATA", the host 100 may provide a write command HRCMD and the data "DATA" to the storage device 200. The memory controller 210 may store the data "DATA" in the memory device 220 in response to the write command HRCMD. To store data "DATA", the memory controller 210 may provide a write command CRCMD and the data "DATA" to the memory device 220. For example, the memory controller 210 may provide the write command CRCMD and the data "DATA" to one of the banks 221 to 23$n$. A bank receiving the write command CRCMD may store the data "DATA".

The write command HRCMD from the host 100 may include stream identification information (i.e., a stream ID). The stream identification information may indicate information for identifying the data "DATA" depending on a characteristic of the provided data "DATA". That is, the same stream identification information may be allocated to the data "DATA" associated with each other. For example, the host 100 may allocate different stream identification information to the data "DATA" generated according to execution of different applications, and may allocate the same stream identification information to the data "DATA" generated from the same application. However, the inventive concept is not limited thereto. For example, different stream identification information may be allocated to the data "DATA" generated from the same application, depending on a characteristic of the data "DATA".

The memory controller 210 may allocate one or more banks, in which the data "DATA" are to be stored, based on stream identification information included in the write command HRCMD. The memory controller 210 may allocate one of the banks 221 to 23$n$ based on a striping size corresponding to stream identification information. The striping size may indicate the number of candidate banks in which data of the same stream identification information are to be stored. For example, in the case where the striping size is "1 CH×2 Bank", the data "DATA" may be stored in one of two candidate banks. For example, in the case where the first and second banks 221 and 222 connected to the first channel CH1 are candidate banks, one of the first and second banks 221 and 222 may be allocated for a bank in which the data "DATA" are to be stored.

Striping size information corresponding to stream identification information may be provided from the host 100 to the memory controller 210. The host 100 may select a striping size for each stream and may provide striping size information for each stream to the memory controller 210.

As described above, the striping size may be determined according to stream identification information of the data "DATA". The memory controller 210 may allocate a bank in which the data "DATA" are to be stored, based on a striping size for each stream.

Below, for convenience of description, it is assumed that the memory device 220 of FIG. 1 includes six banks 221 to 223 and 231 to 233 connected to two channels CH1 and CH2 (i.e., the case that "n" is 3 and "m" is 2). However, the inventive concept is not limited thereto. For example, the memory device 220 may include the given number of banks connected to the given number of channels.

Figure 2:
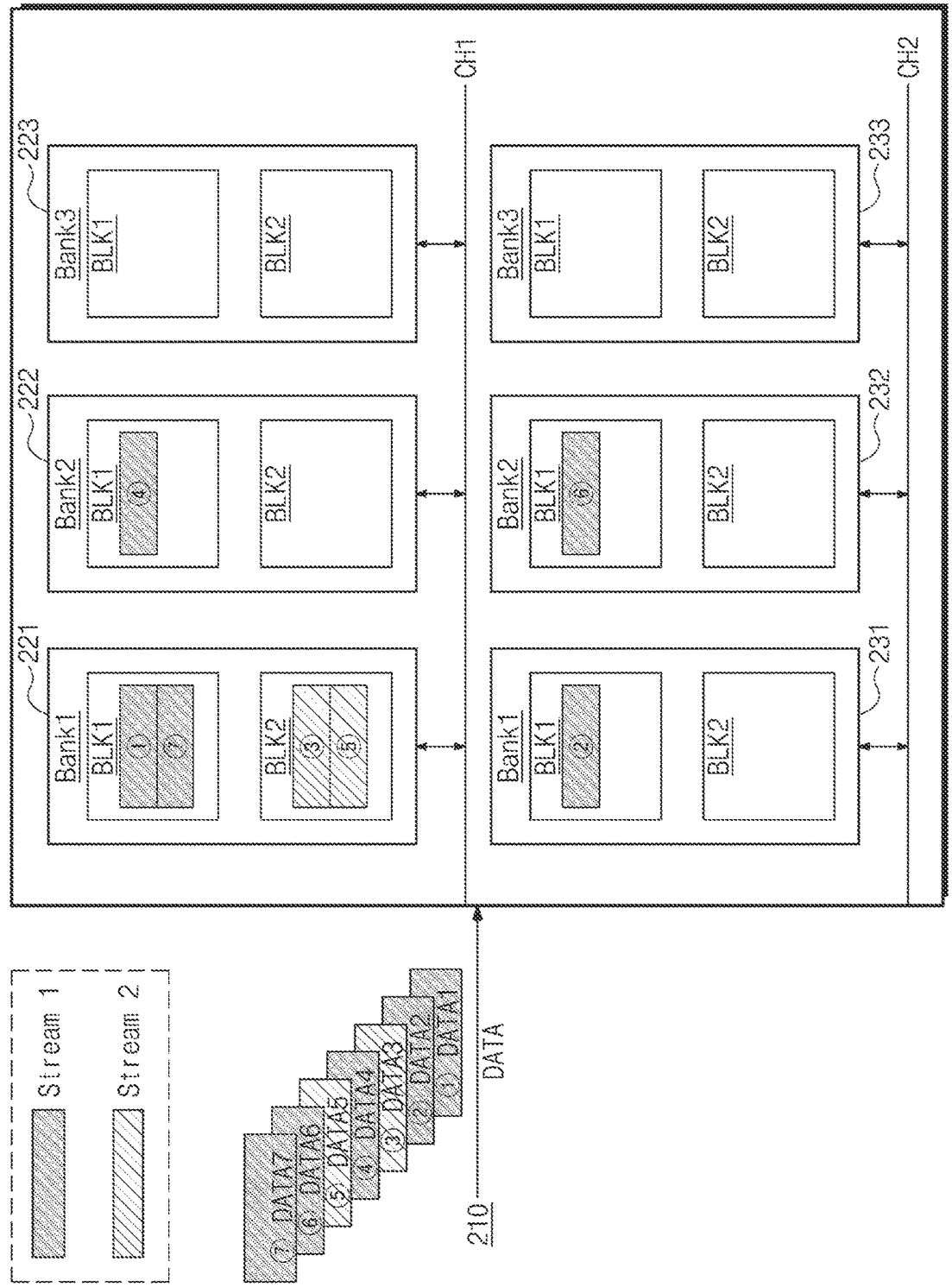
FIG. 2 illustrates an example in which a memory device stores data, according to an embodiment of the inventive concept.

FIG. 2 illustrates an example in which the memory device 220 stores data, according to an embodiment of the inventive concept. Referring to FIG. 2, the memory device 220 may include the first to third banks 221 to 223 connected to the first channel CH1 and the first to third banks 231 to 233 connected to the second channel CH2.

The memory device 220 may store the data "DATA" provided from the memory controller 210. Stream identification information of the provided data "DATA" may be a first stream (Stream 1) or a second stream (Stream 2). The memory controller 210 may determine the stream identification information of the data "DATA" based on the write command HRCMD.

The memory controller 210 may allocate a bank in which the data "DATA" are to be stored, based on a striping size corresponding to the stream identification information of the data "DATA". For example, a striping size corresponding to the first stream may be "2 CH×2 Bank", and a striping size corresponding to the second stream may be "1 CH×1 Bank".

First, with regard to first data DATA1 of the first stream, the memory controller 210 may allocate the first bank 221 connected to the first channel CH1 for a bank in which the first data DATA1 are to be stored, based on the relevant striping size of "2 CH×2 Bank" (①). In detail, the memory controller 210 may allocate a particular address of a first block BLK1 of the first bank 221 for a memory address at which the first data DATA1 are to be stored.

Second, with regard to second data DATA2 of the first stream, the memory controller 210 may allocate a bank, which is different from the first bank 221 allocated to the first data DATA1, for a bank in which the second data DATA2 are to be stored, based on the striping size of "2 CH×2 Bank". The memory controller 210 may allocate the first bank 231 connected to the second channel CH2 for a bank in which the second data DATA2 are to be stored (②). In detail, the memory controller 210 may allocate a particular address of a first block BLK1 of the first bank 231 for a memory address at which the second data DATA2 are to be stored.

Third, with regard to third data DATA3 of the second stream, the memory controller 210 may allocate the first bank 221 for a bank in which the third data DATA3 are to be stored, based on the relevant striping size of "1 CH×1 Bank" (③). In detail, the memory controller 210 may allocate a particular address of a second block BLK2 of the first bank 221 for a memory address at which the third data DATA3 are to be stored.

Fourth, with regard to fourth data DATA4 of the first stream, the memory controller 210 may allocate a bank, which is different from the banks 221 and 231 allocated to the first data DATA1 and the second data DATA2, for a bank in which the fourth data DATA4 are to be stored, based on the striping size of "2 CH×2 Bank". The memory controller 210 may allocate the second bank 222 connected to the first channel CH1 for a bank in which the fourth data DATA4 are to be stored (④). In detail, the memory controller 210 may allocate a particular address of a first block BLK1 of the second bank 222 for a memory address at which the fourth data DATA4 are to be stored.

Fifth, with regard to fifth data DATA5 of the second stream, the memory controller 210 may allocate a bank, which is identical to the bank 221 allocated to the third data DATA3, for a bank in which the fifth data DATA5 are to be stored, based on the striping size of "1 CH×1 Bank". The memory controller 210 may allocate the first bank 221 for a bank in which the fifth data DATA5 are to be stored (⑤). In detail, the memory controller 210 may allocate a particular address of the second block BLK2 of the first bank 221 for a memory address at which the fifth data DATA5 are to be stored. In this case, the memory address allocated to the fifth data DATA5 may be different from the memory address allocated to the third data DATA3.

Sixth, with regard to sixth data DATA6 of the first stream, the memory controller 210 may allocate a bank, which is different from the banks 221, 222, and 231 allocated for the first data DATA1, the second data DATA2, and the fourth data DATA4, for a bank in which the sixth data DATA6 are to be stored, based on the striping size of "2 CH×2 Bank". The memory controller 210 may allocate the second bank 232 connected to the second channel CH2 for a bank in which the sixth data DATA6 are to be stored (⑥). In detail, the memory controller 210 may allocate a particular address of a first block BLK1 of the second bank 232 for a memory address at which the sixth data DATA6 are to be stored.

Seventh, with regard to seventh data DATA7 of the first stream, the memory controller 210 may allocate a bank in which the seventh data DATA7 are to be stored, based on the striping size of "2 CH×2 Bank". Since all the four banks 221, 222, 231, and 232 are allocated to the data DATA1, DATA2, DATA4, and DATA6 of the first stream previously received, the memory controller 210 may allocate one of the four banks 221, 222, 231, and 232 for a bank in which the seventh data DATA7 are to be stored. The memory controller 210 may allocate the first bank 221 for a bank in which the seventh data DATA7 are to be stored (⑦). In detail, the memory controller 210 may allocate a particular address of the first block BLK1 of the first bank 221 for a memory address at which the seventh data DATA7 are to be stored. In this case, the memory address allocated to the seventh data DATA7 may be different from the memory address allocated to the first data DATA1.

The memory controller 210 may provide the data "DATA" to an allocated bank. The memory controller 210 may provide the write command CRCMD and a memory address at which the data "DATA" are to be stored, together with the data "DATA". The memory controller 210 may provide the data "DATA", the write command CRCMD, and the memory address through a channel connected to an allocated bank. The bank may store the data "DATA" at the memory address in response to the write command CRCMD.

For example, the memory controller 210 may provide the first bank 221 with the first data DATA1, the write command CRCMD, and the memory address (the particular address of the first block BLK1). The first bank 221 may store the first data DATA1 at the particular address of the first block BLK1 in response to the write command CRCMD.

As described above, the memory controller 210 may allocate a bank in which the data "DATA" are to be stored, based on a striping size for each stream. In the case where a striping size indicates 2 or more, the memory controller 210 may allocate banks such that the data "DATA" of the same stream are distributed and stored into the plurality of banks. In the case where a striping size indicates "1", the memory controller 210 may allocate one bank such that the data "DATA" of the same stream are stored into the one bank.

In the case where a striping size is large (i.e., the number of candidate banks capable of being allocated to the data "DATA" of the same stream is large), a delay time of write and read operations may decrease compared with the case where a striping size is small (i.e., the number of candidate banks capable of being allocated to the data "DATA" of the same stream is small). In the case where a striping size is large, the number of banks which may be accessed in parallel for the write and read operations may be large. For example, as illustrated in FIG. 2, in the case where a read operation is performed on the first stream, the data "DATA" may be output in parallel from the four banks 221, 222, 231, and 232. In contrast, in the case where a read operation is performed on the second stream, the data "DATA" may be output from the one bank 221. Accordingly, a delay time associated with the first stream may be smaller than a delay time associated with the second stream. As such, in the case where a striping size is large, a peak sequential write and read performance may be improved compared with the case where a striping size is small.

In the case where a striping size is small, a multi-stream support count may be large compared with the case where a striping size is large. The multi-stream support count means the number of streams which may be stored in the memory device 220 and have different characteristics. Since the number of blocks for storing different streams in one bank is limited, it may be necessary to secure spare banks for the purpose of storing various streams. Since the number of banks to be used in the case where a striping size is large is more than the case where a striping size is small, the multi-stream support count may be small. In contrast, since the number of banks to be used in the case where a striping size is small is less than the case where a striping size is large, the multi-stream support count may be large.

As described above, the performance of the memory device 220 may vary with a striping size. According to an embodiment of the inventive concept, a striping size for each stream may be selected by the host 100 depending on a required performance of the memory device 220. A relatively large striping size may be selected with regard to a stream in which the peak sequential write and read performance is important. In the case where the multi-stream support count is important, a relatively small striping size may be selected. As such, the electronic system 1000 may flexibly manage a striping size for each stream, thus making it possible to operate the storage device 200 efficiently.

As illustrated in FIG. 2, the memory controller 210 may allocate the same bank to data (e.g., DATA1 and DATA3) of different streams. In this case, different blocks may be allocated to the data "DATA" of different streams, and the same block may be allocated to the data "DATA" of the same stream. As such, in the case where the data "DATA" of the same stream are stored in the same block together, a performance of a write amplification factor (WAF) may be improved. Accordingly, a lifetime of the memory device 220 may increase.

Figure 3:
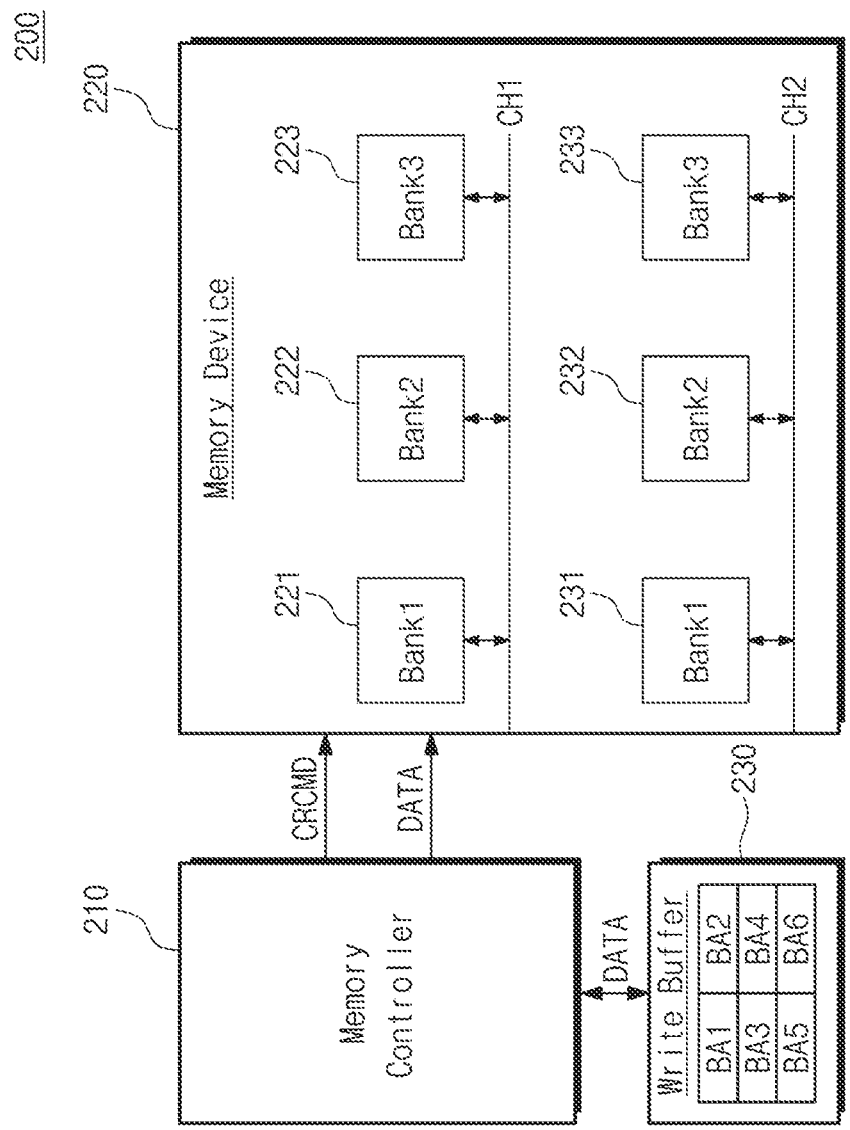
FIG. 3 is a block diagram illustrating an example of a storage device of FIG. 1.

FIG. 3 is a block diagram illustrating an example of the storage device 200 of FIG. 1. Referring to FIG. 3, the storage device 200 may include the memory controller 210, the memory device 220, and a write buffer 230. The memory device 220 may include the banks 221 to 223 connected to the first channel CH1 and the banks 231 to 233 connected to the second channel CH2. Operations of the memory controller 210 and the memory device 220 of FIG. 3 are substantially identical or similar to the operations of the memory controller 210 and the memory device 220 of FIG. 1, and thus, additional description will be omitted to avoid redundancy.

The memory controller 210 may allocate a bank for storing the data "DATA" based on stream identification information. The memory controller 210 may store the data "DATA" to the write buffer 230 before the data "DATA" are provided to the allocated bank of the memory device 220. The memory controller 210 may store the data "DATA" in a particular area corresponding to the allocated bank among areas of the write buffer 230. In the case where the particular area is filled as much as a given magnitude (or greater) and is fully filled as the data "DATA" are stored to the write buffer 230, the memory controller 210 may fetch the data "DATA" stored in the particular area and may store the data "DATA" in the bank. That is, the memory controller 210 may temporarily store the data "DATA" to be stored in the same bank by using the write buffer 230; when the size of the stored data "DATA" is not smaller than a given size, the memory controller 210 may store the data "DATA" in the bank. Accordingly, the memory controller 210 may not only allocate a bank, in which the data "DATA" are to be stored, based on stream identification information, but the memory controller 210 may also allocate a memory address of the write buffer 230 at which the data "DATA" are temporarily to be stored.

The write buffer 230 may include a plurality of buffer areas BA1 to BA6. The buffer areas BA1 to BA6 may respectively correspond to the banks 221 to 233 of the memory device 220. For example, the first buffer area BA1 may correspond to the first bank 221, and the second buffer area BA2 may correspond to the first bank 231. The third buffer area BA3 may correspond to the second bank 222, and the fourth buffer area BA4 may correspond to the second bank 232. For example, the write buffer 230 may be implemented with a volatile memory such as a DRAM, but the inventive concept is not limited thereto.

Figure 4A:
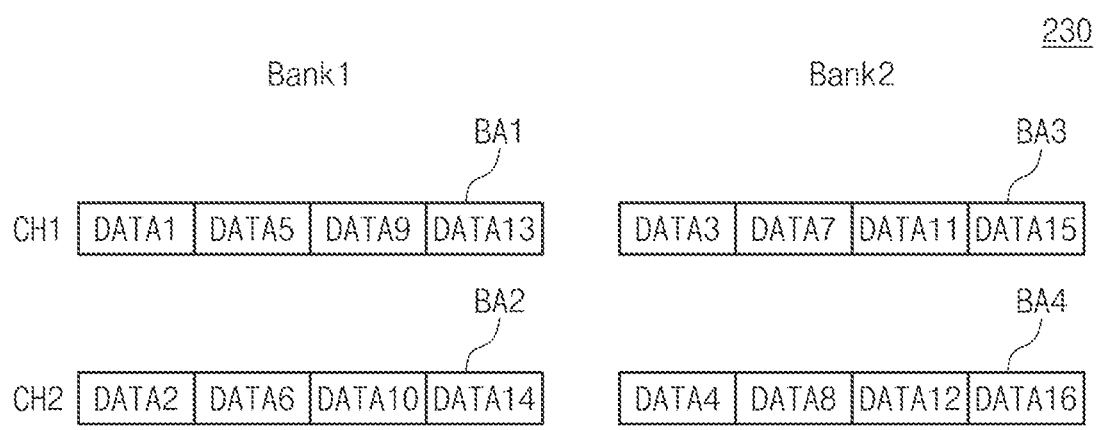
FIGS. 4A and 4B illustrate an example in which data are stored in a write buffer of FIG. 3 depending on a striping size.
Figure 4B:
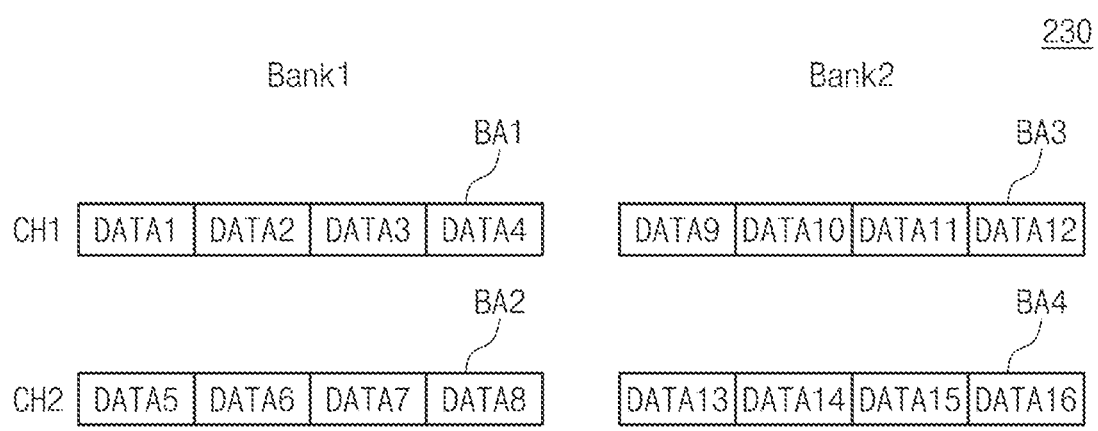

FIGS. 4A and 4B illustrate an example in which data are stored in the write buffer 230 of FIG. 3 depending on a striping size. In detail, FIG. 4A shows an example in which the data "DATA" are stored in the case where a striping size is "2 CH×2 Bank", and FIG. 4B shows an example in which the data "DATA" are stored in the case where a striping size is "1 CH×1 Bank".

Referring to FIGS. 1, 3, 4A, and 4B, $1^{st}$ to $16^{th}$ data DATA1 to DATA16 of the same stream may be sequentially provided from the host 100. To store the $1^{st}$ to $16^{th}$ data DATA1 to DATA16, the memory controller 210 may allocate a bank to the respective data "DATA". A way to allocate banks to the $1^{st}$ to $16^{th}$ data DATA1 to DATA16 may vary with a striping size corresponding to a stream.

The memory controller 210 may store the $1^{st}$ to $16^{th}$ data DATA1 to DATA16 in the write buffer 230 before storing the $1^{st}$ to $16^{th}$ data DATA1 to DATA16 in the memory device 220. The write buffer 230 may include the first to fourth buffer areas BA1 to BA4. The first to fourth buffer areas BA1 to BA4 may correspond to the banks 221, 222, 231, and 232, respectively. For example, the first buffer area BA1 may correspond to the first bank 221, and the second buffer area BA2 may correspond to the first bank 231. The respective data "DATA" may be stored in a buffer area corresponding to an allocated bank among the buffer areas BA1 to BA4.

First, referring to FIG. 4A, since a striping size corresponding to a stream is "2 CH×2 Bank", the memory controller 210 may allocate four banks as a bank in which the data "DATA" are to be stored. For example, the memory controller 210 may allocate the first bank 221 to the first data DATA1, and may allocate the first bank 231 to the second data DATA2. The memory controller 210 may allocate the second bank 222 to the third data DATA3, and may allocate the second bank 232 to the fourth data DATA4. In the case where banks are allocated in the above order, the four banks 221, 222, 231, and 232 may be equally allocated to the $1^{st}$ to $16^{th}$ data DATA1 to DATA16.

Before storing the data "DATA" in an allocated bank, the memory controller 210 may store the data "DATA" in a relevant buffer area as illustrated in FIG. 4A. For example, the memory controller 210 may store the first data DATA1, the fifth data DATA5, the ninth data DATA9, and the thirteenth data DATA13 in the first buffer area BA1 before storing the data DATA1, DATA5, DATA9, and DATA13 in the first bank 221. In the case where the first buffer area BA1 is fully filled (or is filled as much as a given size or greater) as the thirteenth data DATA13 are stored in the first buffer area BA1, the memory controller 210 may store the data DATA1, DATA5, DATA9, and DATA13 stored in the first buffer area BA1 in the first bank 221. Afterwards, the memory controller 210 may delete the data DATA1, DATA5, DATA9, and DATA13 stored in the first buffer area BA1 and may again use the first buffer area BA1. Likewise, in the case where the second to fourth buffer areas BA2 to BA4 are fully filled (or are filled as much as a given size or greater), the memory controller 210 may store data stored in each buffer area in a corresponding bank. Afterwards, the memory controller 210 may delete data stored in each buffer area and may again use each buffer area.

Referring to FIG. 4B, since a striping size corresponding to a stream is "1 CH×1 Bank", the memory controller 210 may allocate one bank for a bank in which the data "DATA" are to be stored. For example, the memory controller 210 may allocate the first bank 221 to the first to fourth data DATA1 to DATA4. In the case where the first bank 221 cannot be allocated as the first bank 221 is allocated to the first to fourth data DATA1 to DATA4, the memory controller 210 may allocate any other bank to the data "DATA" to be provided later. For example, the memory controller 210 may allocate the first bank 231 to the fifth to eighth data DATA5 to DATA8. Likewise, the memory controller 210 may allocate the second bank 222 to the ninth to twelfth data DATA9 to DATA12, and may allocate the second bank 232 to the thirteenth to sixteenth data DATA13 to DATA16.

Before storing the data "DATA" in an allocated bank, the memory controller 210 may store the data "DATA" in a relevant buffer area as illustrated in FIG. 4B. For example, the memory controller 210 may store the first to fourth data DATA1 to DATA4 in the first buffer area BA1 before storing the data DATA1 to DATA4 in the first bank 221. In the case where the first buffer area BA1 is fully filled (or is filled as much as a given size or greater) as the fourth data DATA4 are stored in the first buffer area BA1, the memory controller 210 may store the data DATA1 to DATA4 stored in the first buffer area BA1 in the first bank 221. Afterwards, the memory controller 210 may delete the data DATA1 to DATA4 stored in the first buffer area BA1 and may again use the first buffer area BA1. Likewise, in the case where the second to fourth buffer areas BA2 to BA4 are fully filled (or are filled as much as a given size or greater), the memory controller 210 may store data stored in each buffer area in a corresponding bank. Afterwards, the memory controller 210 may delete data stored in each buffer area and may again use each buffer area.

As described above, the storage device 200 may use the write buffer 230 for the purpose of temporarily storing the data "DATA". As illustrated in FIG. 4A, in the case where a striping size is "2 CH×2 Bank", the data "DATA" of the first buffer area BA1 may be stored in the first bank 221 after the thirteenth data DATA13 are provided. In contrast, as illustrated in FIG. 4B, in the case where a striping size is "1 CH×1 Bank", the data "DATA" of the first buffer area BA1 may be stored in the first bank 221 after the fourth data DATA4 are provided. As such, a time when the data "DATA" of the first buffer area BA1 of FIG. 4A are stored in the first bank 221 may be slower than a time when the data "DATA" of the first buffer area BA1 of FIG. 4B are stored in the first bank 221. Also, a time to reuse the first buffer area BA1 of FIG. 4A may be slower than a time to reuse the first buffer area BA1 of FIG. 4B. That is, in the case where a striping size is large, a period capable of reusing the write buffer 230 may become longer compared with the case where a striping size is small. Accordingly, in the case where a striping size is large, the write buffer 230 of a higher capacity may be required.

As such, the host 100 may select a striping size for each stream in consideration of a capacity of the write buffer 230. For example, to reduce a capacity of the write buffer 230 to be used, the host 100 may set a striping size corresponding to a particular stream to a small size.

Figure 5:
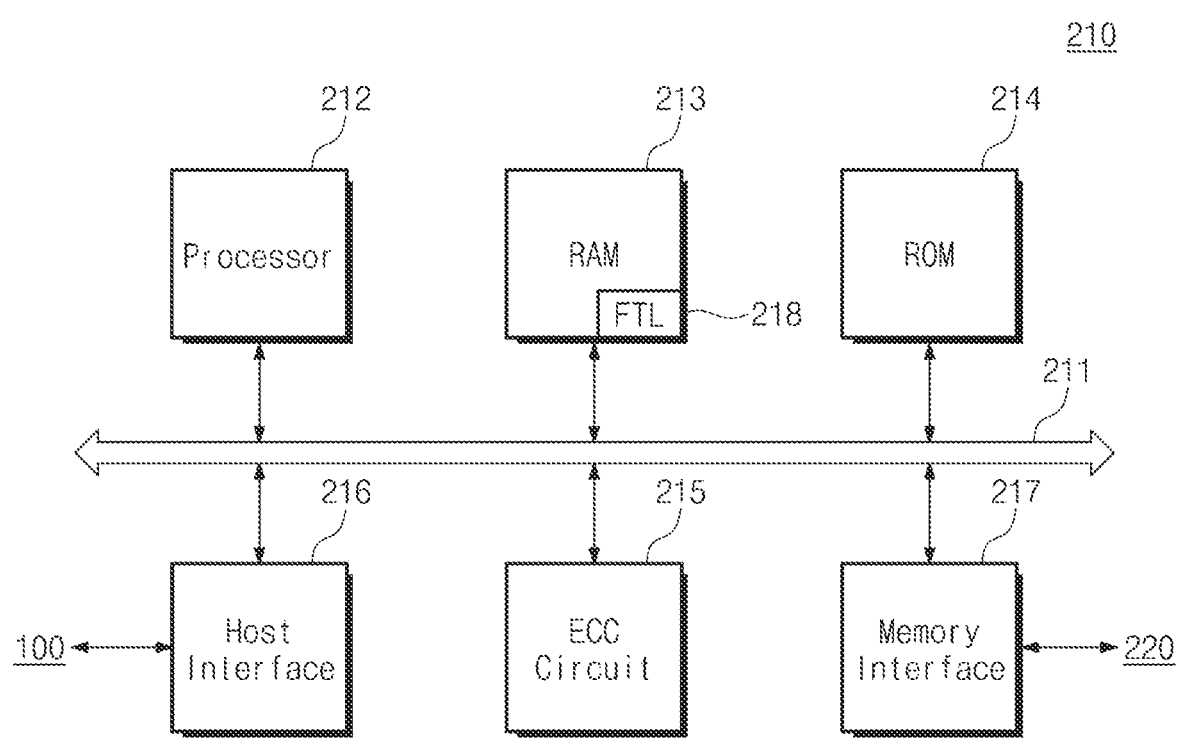
FIG. 5 is a block diagram illustrating an example of a memory controller of FIG. 1.

FIG. 5 is a block diagram illustrating an example of the memory controller 210 of FIG. 1. Referring to FIG. 5, the memory controller 210 may include a bus 211, a processor 212, a RAM 213, a ROM 214, an error correction code (ECC) circuit 215, a host interface 216, and a memory interface 217. As illustrated, the bus 211 is configured to provide a channel between the components of the memory controller 210. The processor 212 may control overall operations of the memory controller 210. For example, the processor 212 may control an operation of allocating a bank in which the data "DATA" are to be stored, in response to the write command HRCMD from the host 100.

The RAM 213 may be used as a buffer memory, a cache memory, or a working memory of the memory controller 210. The RAM 213 may store codes and commands which the processor 212 executes, and may store data processed by the processor 212. The RAM 213 may include a flash translation layer (FTL) 218. The FTL 218 may be software or firmware which performs various management operations between the host 100 and the memory device 220 such that the memory device 220 may be efficiently used. In an embodiment, the FTL 218 stored in the RAM 213 may be driven by the processor 212.

For example, the FTL 218 may allocate a bank, in which the data "DATA" are to be stored, based on a striping size for each stream, and may manage a memory address of the allocated bank. Also, the FTL 218 may allocate a memory address of the write buffer 230, at which the data "DATA" are temporarily to be stored, depending on the allocated bank, and may manage the allocated memory address of the write buffer 230.

The ROM 214 may store a variety of information necessary for the memory controller 210 to operate, in the form of firmware. For example, the ROM 214 may store striping size information corresponding to stream identification information. However, the inventive concept is not limited thereto. For example, striping size information corresponding to stream identification information may be stored in the RAM 213.

The ECC circuit 215 may generate a parity bit for error correction before storing the data "DATA" in the memory device 220. Also, the ECC circuit 215 may correct an error of the data "DATA" output from the memory device 220 by using a parity bit. In an embodiment, the ECC circuit 215 may generate a parity bit based on a striping size. For example, in the case where a striping size is "2 CH×2 Bank", the ECC circuit 215 may generate a parity bit with respect to the data "DATA" to be stored in three banks. That is, the data "DATA" may be stored in three of four banks, and a parity bit may be stored in remaining one bank. In the case where a striping size is "1 CH×2 Bank", the ECC circuit 215 may generate a parity bit with respect to the data "DATA" to be stored in one bank. As such, as a striping size decreases, the number of parity bits to be generated may increase, and thus, the reliability of the storage device 200 may be improved. Accordingly, the host 100 may select a striping size for each stream in consideration of the peak sequential write and read performance, the multi-stream support count, and the reliability of the storage device 200.

The memory controller 210 may communicate with the host 100 through the host interface 216. For example, the memory controller 210 may receive information about a striping size selected for each stream through the host interface 216. The memory controller 210 may receive the write command HRCMD including stream identification information through the host interface 216. For example, the host interface 216 may perform communication in compliance with an NVMe (Non-Volatile Memory express) protocol, but the inventive concept is not limited thereto.

The memory controller 210 may communicate with the memory device 220 through the memory interface 217. For example, the memory controller 210 may provide the write command CRCMD and the data "DATA" to an allocated bank through the memory interface 217.

Figure 6:
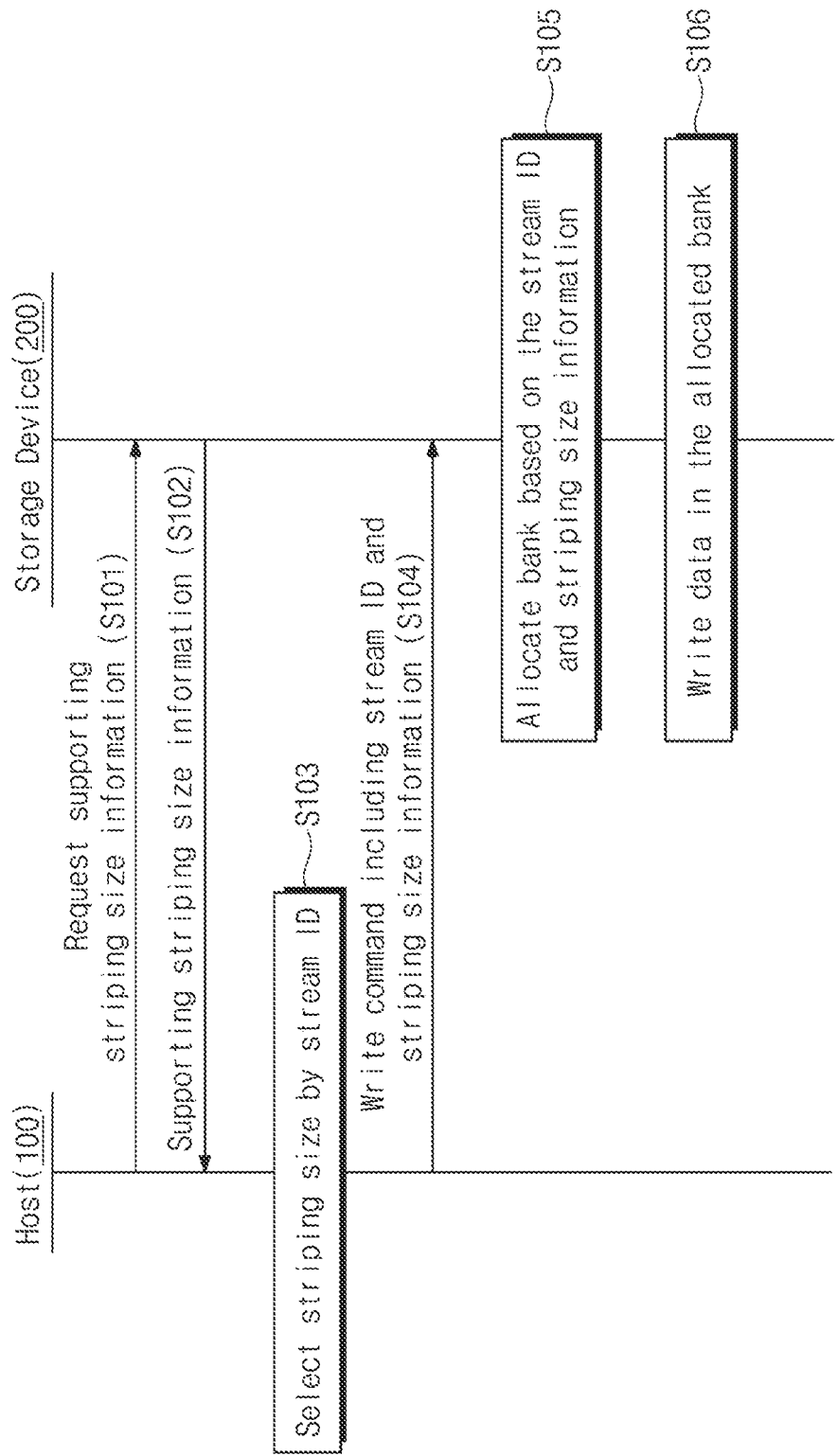
FIG. 6 is a diagram illustrating an example of a write operation, which a host and a storage device of FIG. 1 perform.

FIG. 6 is a diagram illustrating an example of a write operation which the host 100 and the storage device 200 of FIG. 1 perform. Referring to FIG. 6, in operation S101, the host 100 may request supporting striping size information from the storage device 200. The supporting striping size information indicates maximum striping size information which the storage device 200 may provide. For example, in the case where the storage device 200 may provide maximum "4 CH×4 Bank" striping, the supporting striping size information may be "4 CH×4 Bank". For example, the host 100 may request the supporting striping size information from the storage device 200 through a directive command or an identify command. However, the inventive concept is not limited thereto. For example, the host 100 may request the supporting striping size information by using a separate command.

In operation S102, the storage device 200 may provide the supporting striping size information to the host 100. In operation S103, the host 100 may select a striping size for each stream based on the supporting striping size information. For example, in the case where the supporting striping size information is "4 CH×4 Bank", the host 100 may select "2 CH×2 Bank" with respect to a first stream and may select "1 CH×1 Bank" with respect to a second stream.

In operation S104, the host 100 may provide the storage device 200 with the write command HRCMD including the stream identification information and the striping size information. For example, the write command HRCMD may include the stream identification information indicating the first stream and the striping size information indicating "2 CH×2 Bank". Also, the host 100 may provide write data "DATA" to the storage device 200.

In operation S105, the storage device 200 may allocate a bank, in which the data "DATA" are to be stored, based on the stream identification information and the striping size information included in the write command HRCMD. In operation S106, the storage device 200 may write the data "DATA" into the allocated bank.

Figure 7:
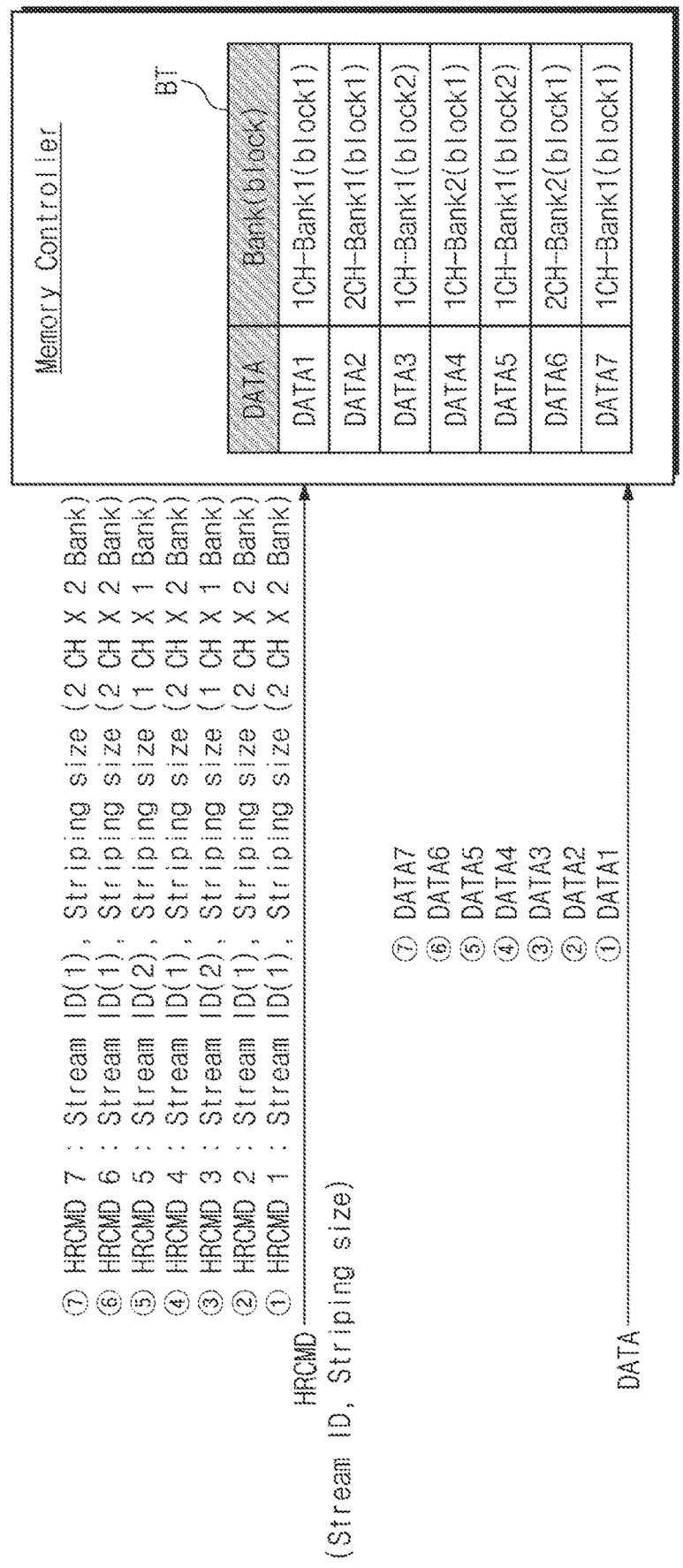
FIG. 7 is a diagram illustrating an exemplary operation of a memory controller for a write operation of FIG. 6.

FIG. 7 is a diagram illustrating an exemplary operation of the memory controller 210 for a write operation of FIG. 6. In detail, an example of the write operation of FIG. 7 coincides with an example of the write operation of FIG. 2. Referring to FIG. 7, the memory controller 210 may receive first to seventh write commands HRCMD1 to HRCMD7 and the first to seventh data DATA1 to DATA7 from the host 100 (①) to (⑦)). The first to seventh write commands HRCMD1 to HRCMD7 may respectively correspond to the first to seventh data DATA1 to DATA7. For example, the first write command HRCMD1 may be the write command HRCMD for the first data DATA1. Each of the first to seventh write commands HRCMD1 to HRCMD7 may include stream identification information and striping size information.

Each of the write commands HRCMD1, HRCMD2, HRCMD4, HRCMD6, and HRCMD7 may include the stream identification information indicating the first stream and the striping size information indicating "2 CH×2 Bank". Each of the write commands HRCMD3 and HRCMD5 may include the stream identification information indicating the second stream and the striping size information indicating "1 CH×1 Bank".

The memory controller 210 may allocate a bank for each of the data DATA1 to DATA7 based on the stream identification information and the striping size information, as illustrated in FIG. 2. For example, the memory controller 210 may allocate the first bank 221 connected to the first channel CH1 to the first data DATA1, and may allocate the first bank 231 connected to the second channel CH2 to the second data DATA2.

The memory controller 210 may map memory addresses of banks allocated to the respective data "DATA" and may store mapping information in a mapping table BT. The mapping table BT may be stored in the RAM 213 or the ROM 214 of FIG. 5 or in an external memory. For example, the memory controller 210 may map the first data DATA1 and an address of a first block of the first bank 221 connected to the first channel CH1 and may store a mapping result in the mapping table BT. The memory controller 210 may map the third data DATA3 and an address of a second block of the first bank 221 connected to the first channel CH1 and may store a mapping result in the mapping table BT.

An example is illustrated in FIG. 7 as mapping information between the data "DATA" and a memory address is stored in the mapping table BT, but the inventive concept is not limited thereto. For example, in the case where a logical address corresponding to the data "DATA" is received from the host 100, the memory controller 210 may map the logical address and a memory address (i.e., a physical address of the memory device 220) and may store the mapping information in the mapping table BT.

Figure 8:
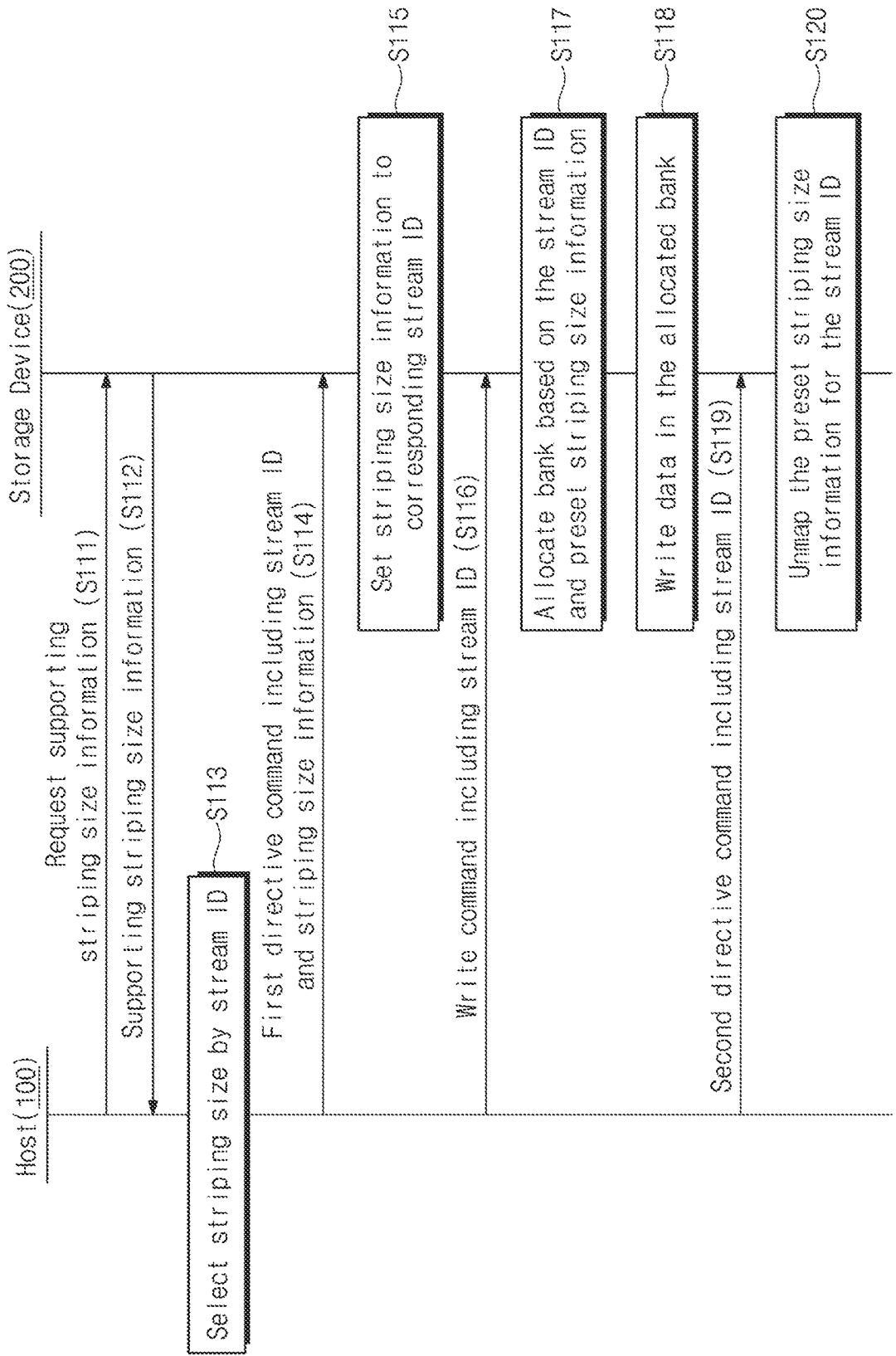
FIG. 8 is a diagram illustrating another example of a write operation which a host and a storage device of FIG. 1 perform.

FIG. 8 is a diagram illustrating another example of a write operation which the host 100 and the storage device 200 of FIG. 1 perform. Referring to FIG. 8, operation S111 to operation S113 are identical to operation S101 to operation S103 of FIG. 6, and thus, additional description will be omitted to avoid redundancy.

In operation S114, the host 100 may provide the storage device 200 with a first directive command including stream identification information and striping size information. The host 100 may set various information necessary for an operation of the storage device 200 through the directive command. For example, the first directive command may be a directive receive command.

As the first directive command including the stream identification information and the striping size information is provided to the storage device 200, in operation S115, the storage device 200 may set a striping size corresponding to the stream identification information of the first directive command. For example, a striping size corresponding to a first stream may be set to "2 CH×2 Bank". The storage device 200 may map and store the striping size and relevant stream identification information.

In operation S116, the host 100 may provide the storage device 200 with the write command HRCMD including the stream identification information. The host 100 may provide the data "DATA" to the storage device 200 together with the write command HRCMD.

In operation S117, the storage device 200 may allocate a bank, in which the data "DATA" are to be stored, based on the stream identification information of the write command HRCMD and preset striping size information. The preset striping size information may be striping size information corresponding to the stream identification information. In operation S118, the storage device 200 may write the data "DATA" in the allocated bank.

In operation S119, the host 100 may provide the storage device 200 with a second directive command including stream identification information. For example, the second directive command may be a directive send command.

As the second directive command including the stream identification information is provided to the storage device 200, in operation S120, the storage device 200 may unmap a striping size set to correspond to the stream identification information of the second directive command. That is, the storage device 200 may delete striping size information set to correspond to stream identification information. For example, in the case where the stream identification information indicating the first stream is included in the second directive command, the storage device 200 may unmap a striping size set to correspond to the first stream.

A description is given in FIG. 8 as the second directive command includes stream identification information, but the inventive concept is not limited thereto. For example, in the case where the second directive command which does not include stream identification information is provided to the storage device 200, the storage device 200 may overall unmap a striping size set for each stream.

A description is given in FIG. 8 as operation S119 and operation S120 are performed after operation S118, but the inventive concept is not limited thereto. For example, an operation of unmapping a striping size set by the second directive command may be performed regardless of write operations of operation S111 to operation S118.

As described above, in the case where a striping size for each stream is in advance set by using a separate directive command, the write command HRCMD may include only stream identification information. As such, striping size information may not be included in the write command HRCMD. Accordingly, the amount of data to be provided from the host 100 to the storage device 200 may be reduced, and thus, a speed of a write operation may be improved.

Figure 9:
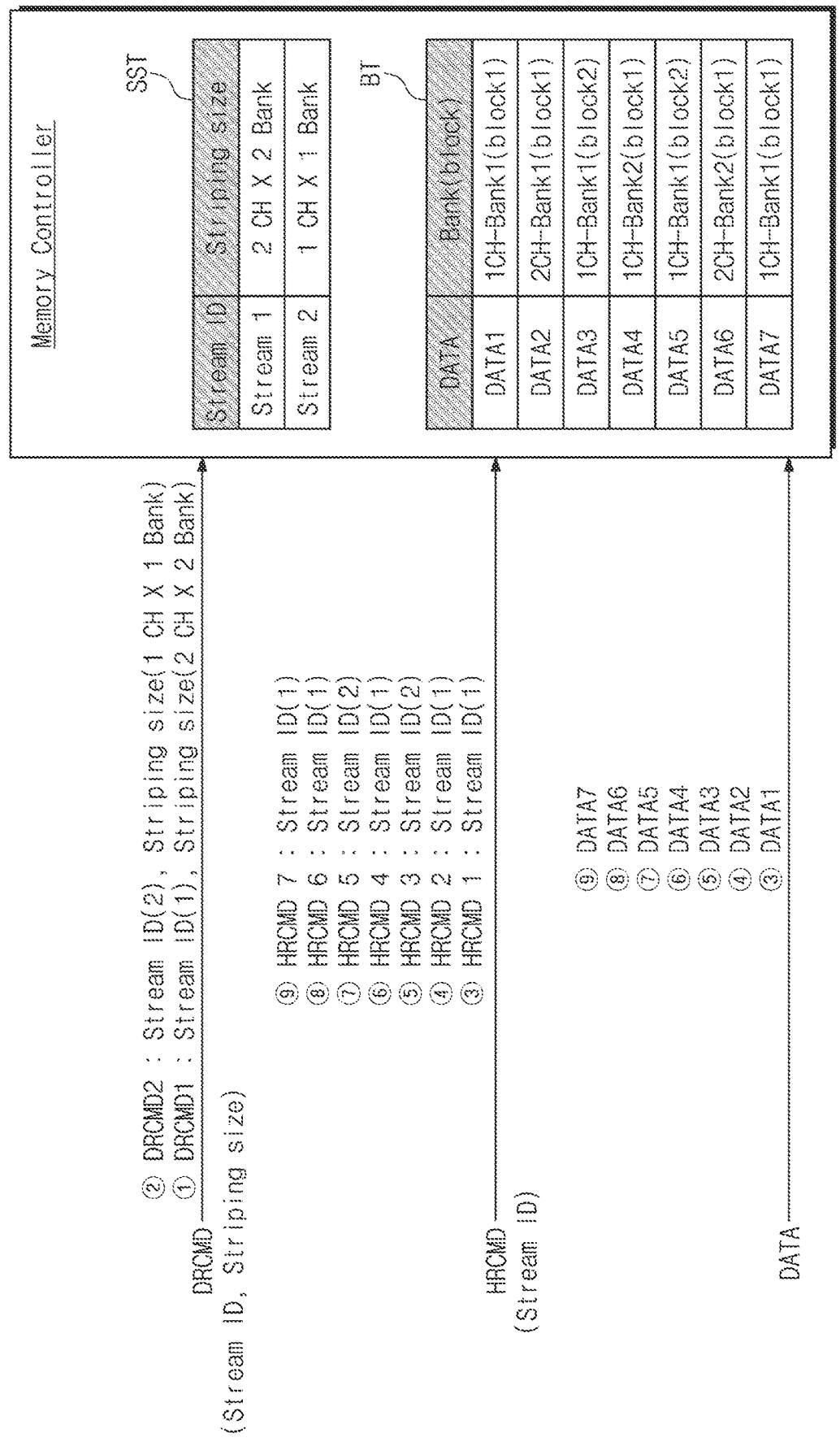
FIG. 9 is a diagram illustrating an exemplary operation of a memory controller for a write operation of FIG. 8.

FIG. 9 is a diagram illustrating an exemplary operation of the memory controller 210 for a write operation of FIG. 8. In detail, an example of the write operation of FIG. 9 coincides with an example of the write operation of FIG. 2. Referring to FIG. 9, first, the memory controller 210 may receive two first directive commands DRCMD1 and DRCMD2 (①, ②). The first directive command DRCMD1 and DRCMD2 may include stream identification information and striping size information. The first directive command DRCMD1 may include the stream identification information indicating the first stream and the striping size information indicating "2 CH×2 Bank". The first directive command DRCMD2 may include the stream identification information indicating the second stream and the striping size information indicating "1 CH×1 Bank".

In the case where the first directive command DRCMD1 and DRCMD2 is received, the memory controller 210 may recognize that the first directive command DRCMD1 and DRCMD2 is a command for setting a striping size, based on a directive type or a directive operation value. In this case, the first directive command DRCMD1 and DRCMD2 may include the directive type and the directive operation value.

In response to the first directive command DRCMD1, the memory controller 210 may map a striping size of "2 CH×2 Bank" and the first stream and may store mapping information in a mapping table SST. In response to the first directive command DRCMD2, the memory controller 210 may map a striping size of "1 CH×1 Bank" and the second stream and may store mapping information in the mapping table SST. The mapping table SST may be stored in the RAM 213 or the ROM 214 of FIG. 5 or in an external memory.

Afterwards, the memory controller 210 may receive the first to seventh write commands HRCMD1 to HRCMD7 and the first to seventh data DATA1 to DATA7 from the host 100 (③ to ⑨). The first to seventh write commands HRCMD1 to HRCMD7 may respectively correspond to the first to seventh data DATA1 to DATA7. Each of the first to seventh write commands HRCMD1 to HRCMD7 may include stream identification information.

Each of the write commands HRCMD1, HRCMD2, HRCMD4, HRCMD6, and HRCMD7 may include the stream identification information indicating the first stream. Each of the write commands HRCMD3 and HRCMD5 may include the stream identification information indicating the second stream.

The memory controller 210 may allocate a bank for each of the data DATA1 to DATA7 based on the stream identification information and striping size information set in advance to correspond to the stream identification information, as illustrated in FIG. 2. The memory controller 210 may map memory addresses of banks allocated to the respective data "DATA" and may store mapping information in a mapping table BT.

Figure 10:
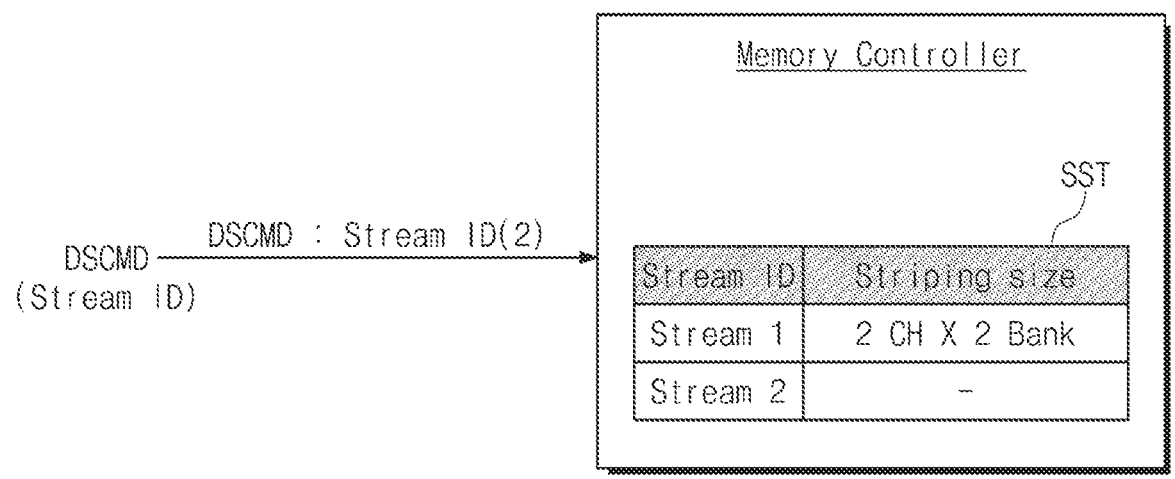
FIG. 10 is a diagram illustrating an exemplary operation of a memory controller for unmapping a striping size of FIG. 8.

FIG. 10 is a diagram illustrating an exemplary operation of the memory controller 210 for unmapping a striping size of FIG. 8. Referring to FIG. 10, the memory controller 210 may receive a second directive command DSCMD. The second directive command DSCMD may include stream identification information indicating the second stream.

In the case where the second directive command DSCMD is received, the memory controller 210 may recognize that the second directive command DSCMD is a command for unmapping a striping size for a stream, based on a directive type or a directive operation value. In this case, the second directive command DSCMD may include the directive type and the directive operation value.

In response to the second directive command DSCMD, the memory controller 210 may unmap a striping size mapped onto the second stream and may update mapping information of the mapping table SST.

As described above, the host 100 according to an embodiment of the inventive concept may dynamically select a striping size for each stream, and the storage device 200 may store the data "DATA" based on the striping size for each stream. As such, the storage device 200 may apply a striping policy in consideration of a required performance of the host 100. However, the inventive concept is not limited thereto. For example, the host 100 may dynamically select a striping size for each namespace, and the storage device 200 may store the data "DATA" based on the striping size for each namespace.

Figure 11:
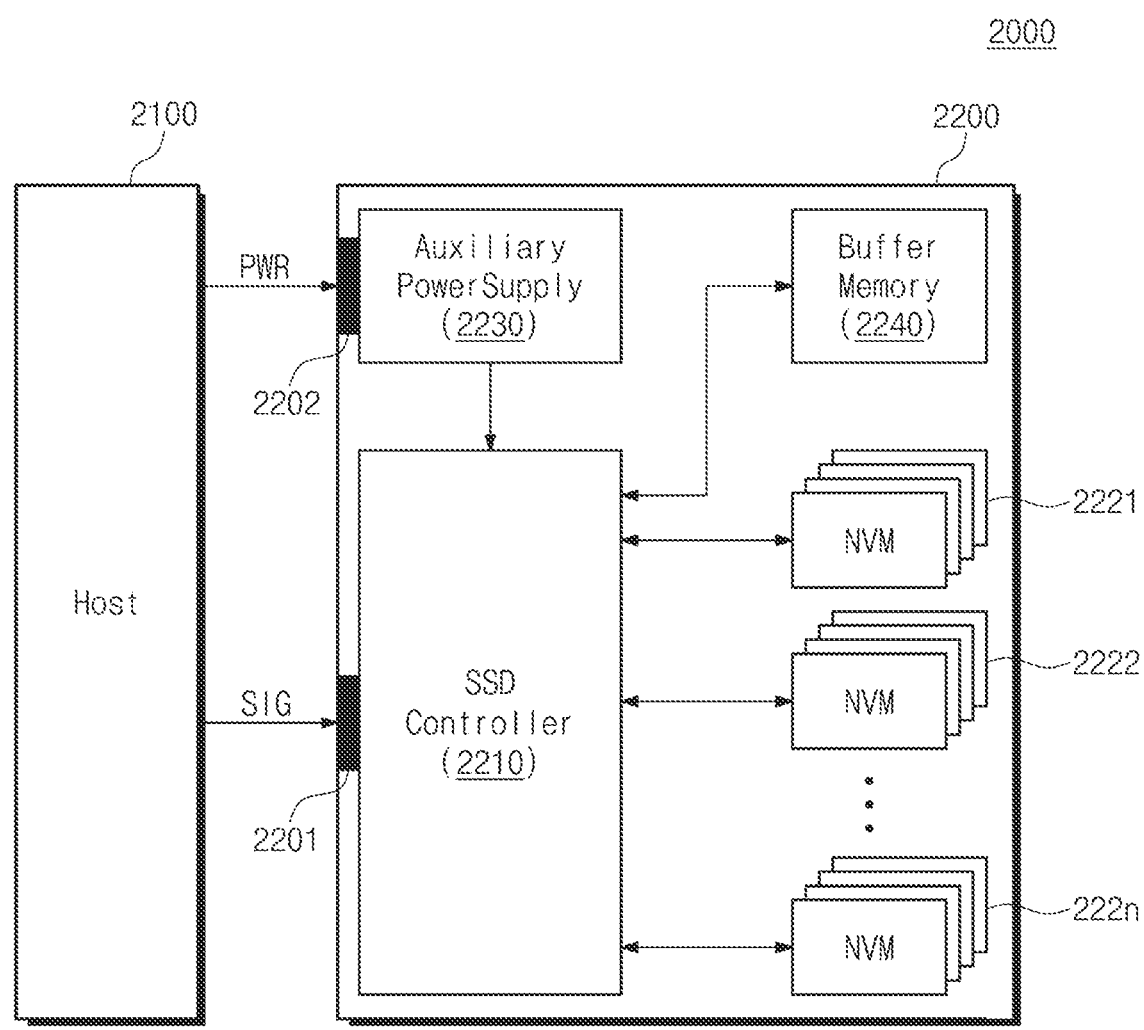
FIG. 11 is a block diagram illustrating an SSD system according to an embodiment of the inventive concept.

FIG. 11 is a block diagram illustrating an SSD system 2000 according to an embodiment of the inventive concept. Referring to FIG. 11, the SSD system 2000 includes a host 2100 and an SSD 2200. The SSD 2200 exchanges a signal SIG with the host 2100 through a signal connector 2201 and is supplied with a power PWR through a power connector 2202. The SSD 2200 may include an SSD controller 2210, a plurality of flash memories 2221 to 222n, an auxiliary power supply 2230, and a buffer memory 2240. Each of the flash memories 2221 to 222n may be implemented with a separate die or a separate chip. For example, each of the flash memories 2221 to 222n may include a bank described with reference to FIGS. 1 to 10.

The SSD controller 2210 may control the flash memories 2221 to 222n in response to the signals SIG received from the host 2100. The flash memories 2221 to 222n may operate under control of the SSD controller 2210. The SSD controller 2210 may include the function of the memory controller 210 described with reference to FIGS. 1 to 10. For example, the SSD controller 2210 may receive the write command HRCMD, in which stream identification information is included, and the data "DATA" from the host 2100. The SSD controller 2210 may allocate one, in which the data "DATA" are to be stored, of the flash memories 2221 to 222n based on a striping size corresponding to the stream identification information. The SSD controller 2210 may store the data "DATA" in the allocated flash memory.

The auxiliary power supply 2230 is connected with the host 2100 through the power connector 2202. The auxiliary power supply 2230 may be charged by the power PWR from the host 2100. In the case where the power PWR is not smoothly supplied from the host 2100, the auxiliary power supply 2230 may provide the power of the SSD 2200.

The buffer memory 2240 operates as a buffer memory of the SSD 2200. The buffer memory 2240 may include the function of the write buffer 230 described with reference to FIGS. 3 and 4. For example, the buffer memory 2240 may temporarily store data received from the host 2100, or may temporarily store metadata (e.g., the mapping tables BT and SST of FIG. 9) of the flash memories 2221 to 222n. Alternatively, the buffer memory 2240 may temporarily store a variety of information needed for the SSD controller 2210 to operate.

According to the inventive concept, a striping policy may be applied in consideration of a peak sequential write and read performance, a multi-stream support count, and a reliability of a storage device.

Also, according to the inventive concept, in the storage device, the amount of a buffer memory used may be reduced by applying a striping policy for each stream.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A method of operating a storage which includes a plurality of banks, the method comprising:
   requesting supporting striping size information from the storage via a directive command issued by a host; then
   receiving a write command including stream identification information and a striping size corresponding to the stream identification information from the host;
   allocating a bank, in which data associated with the write command are to be stored, from among the plurality of banks based on the striping size, in response to the write command; and
   writing the data in the allocated bank; and
   wherein the striping size is selected based on the supporting striping size information provided from the storage in response to the directive command.

2. The method of claim 1, wherein the striping size indicates the number of candidate banks in which data of the same stream identification information are to be stored.

3. The method of claim 1, further comprising storing the data in a buffer area corresponding to the allocated bank before storing the data in the allocated bank, among a plurality of buffer areas of the storage.

4. The method of claim 3, further comprising storing, when the buffer area is fully filled after the data are stored in the buffer area, the data stored in the buffer area in the allocated bank.

5. A method of operating a host which controls a storage including a plurality of banks, the method comprising:
   requesting supporting striping size information to the storage through a directive command; then
   selecting a striping size for each of one or more streams; and
   providing striping size information about the selected striping size and stream identification information corresponding to the selected striping size to the storage through a write command;
   wherein a bank, in which data associated with the write command are to be stored, from among the plurality of banks is allocated based on the striping size information and the stream identification information; and
   wherein the striping size is selected based on the supporting striping size information provided from the storage.

6. The method of claim 5, further comprising allocating the same stream identification information for data generated from the same application executed in the host.

7. A storage comprising:
   a memory including a plurality of banks; and
   a memory controller;
   wherein supporting size striping information is requested from the storage via a directive command issued by a host;
   wherein, in response to a write command including stream identification information and striping size corresponding to the stream identification information from the host, the memory controller is configured to allocate a bank, in which data associated with the write command are to be stored, from among the plurality of banks based on the striping size; and
   wherein the striping size is selected based on the supporting striping size information provided from the storage in response to the directive command.

8. The storage of claim 7, wherein the bank in which the data are to be stored is allocated based on both the striping size and the stream identification information about the data.

9. The storage of claim 7, further comprising:
   a write buffer including a plurality of buffer areas,
   wherein the memory controller stores the data in a buffer area corresponding to the allocated bank before storing the data in the allocated bank.

10. The storage of claim 9, wherein, when the buffer area is fully filled after the data are stored in the buffer area, the memory controller stores the data stored in the buffer area in the allocated bank.

11. The storage of claim 7, wherein the striping size indicates the number of candidate banks in which data of the same stream identification information are to be stored.

12. The storage of claim 7, wherein the striping size indicates the number of candidate banks in which data of the same stream identification information are to be stored.

13. The storage of claim 7, wherein the memory controller is further configured to store:
- (i) first stream identification information and corresponding first striping size information associated with a first write command; and
- (ii) second stream identification information and corresponding second striping size information associated with a second write command, wherein the memory controller is configured to respond to the first write command by storing a first stream of write data in a single bank among the plurality of banks based on the corresponding first striping size information; and wherein the memory controller is configured to respond to the second write command by storing a second stream of write data across multiple banks among the plurality of banks based on the corresponding second striping size information.

* * * * *